INVENTOR
ROBERT R. PITTMAN
BY
E. Mickey Hubbard
ATTORNEY

INVENTOR
ROBERT R. PITTMAN
BY E. Mickey Hubbard
ATTORNEY

United States Patent Office 3,321,770
Patented May 23, 1967

3,321,770
APPARATUS FOR VARIABLE DENSITY RECORDING
Robert R. Pittman, Dallas, Tex., assignor to Texas Instruments Incorporated, Dallas, Tex., a corporation of Delaware
Filed Dec. 4, 1964, Ser. No. 416,094
9 Claims. (Cl. 346—110)

The present invention relates generally to the art of recording data, and more specifically relates to the art of recording geophysical data in variable density form for visual inspection.

There are many instances when it is desirable to record data with respect to one or more ordinate axes. For example, the amplitude of a seismic transient or seismic reflection signal is customarily recorded with respect to lapsed time for subsequent analysis and examination. The seismic signal is usually magnetically recorded in the field and must be converted to a visual presentation before it can be conveniently examined and analyzed. It is customary to present the seismic data in the form of an amplitude modulated line or trace. In more recent times, seismic signals have been represented by variable area lines and by variable density lines. Variable density presentations offer considerable promise in that a number of such lines disposed in side-by-side relationship tend to produce patterns representative of the strata of the earth. Variable density recording presents very substantial problems in application, however, due to the difficulty inherent in maintaining the tonal qualities representative of the absolute values of the signal throughout the exposure and development process, and in general this approach has not been entirely satisfactory to date.

In copending U.S. application S.N. 400,369, filed by Rockwell on Sept. 30, 1964, entitled, "Method and System for Interpretation of Geophysical Data," and assigned to the assignee of the present invention, a method and system was described for plotting a seismic reflection signal as a varible density, scalar wave-front pattern. In that system, seismic response signals corrected to correspond to response signals generated and received at points spaced along a datum plane are converted to wave-front patterns by producing variable density arcs each representative of the value at a point in time and having a radius and an apparent center determined by acoustical velocity information for the particular area. These variable density wave-front patterns are recorded on a common sheet in relative scalar positions. The overlapping wave-front patterns produce reinforcement along common tangent lines which are representative of the various subsurface strata. However, recording of these scalar wave-front patterns in variable density form presents the same problems as in previous variable density recording procedures and systems.

The object of the present invention is to provide an improved method and apparatus for recording data in variable density form, in either one or two dimensions as desired.

Another object of the invention is to provide such a process and apparatus wherein the variable density values representative of the data values are not dependent upon the retention of particular photographic tones during the exposure and development process.

Another object of the invention is to provide an improved system for producing variable density scalar wave-front patterns.

Another object of the invention is to provide a variable density recording system which can be used for compositing a number of seismic response signals, either linearly, or in migrated position.

These and other objects are accomplished by recording the data as a large number of dots substantially uniform size and density, the number of dots per unit area being representative of the value being recorded. More specifically, this is accomplished by scanning a beam of recording energy over a medium sensitive to the energy. The beam of energy is in the form of a series of pulses of uniform intensity and duration, but occurring at a repetition rate determined by values of the data to be recorded.

In accordance with a more specific aspect of the invention, a variable density recording system constructed in accordance with this invention is comprised of a cathode ray tube or other device for generating and scanning a beam of energy. A circuit means is connected to the cathode ray tube for scanning the beam of the tube in a predetermined manner, and a circuit means is connected to modulate the beam of the tube such that the beam is comprised of a series of uniform pulses the repetition rate of which are representative of data to be recorded as a particular density. The beam may be scanned over the luminescent screen of the tube, or similar device, for observation, and a camera means is preferably provided to permanently record the image on the screen.

In accordance with a more specific aspect of the invention, the means for modulating the beam of the cathode ray tube comprises a blocking oscillator the output repetition rate of which is modulated by a signal proportional in magnitude to the instantaneous value of the data signal to be recorded as a variable density. A pulse amplifier is connected to the output of the blocking oscillator to provide pulses of uniform shapes which are used to modulate the beam of the cathode ray tube.

In accordance with another aspect of the invention, provision is made to maintain the correct dot density regardless of the speed at which the beam is scanned over the screen. This is accomplished by multiplying the input data signal by a signal representative of the speed of the beam over the face of the tube.

Additional aspects, objects and advantages of the invention will be evident to those skilled in the art from the following detailed description and drawings, wherein:

FIGURE 5 is a schematic illustration of another type of variable density recording in accordance with the present invention.

Figure 1:
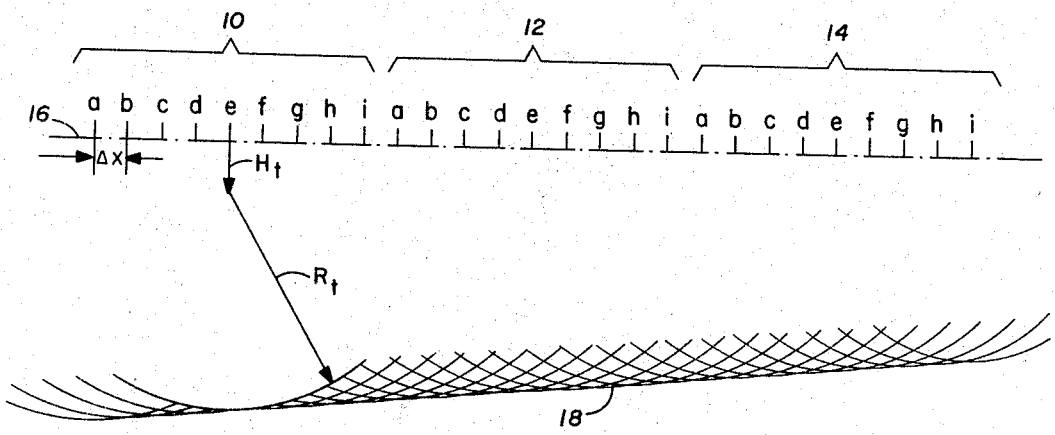
FIGURES 1 and 2 are schematic diagrams illustrating the manner in which seismic data may be collected and subsequently presented as a variable density seismic wave-front pattern in accordance with the present invention.

As previously mentioned, the present invention is generally concerned with the recordation of data in variable density form for visual inspection, and is particularly concerned with recording seismic response data in migrated and composited form in the general manner described in the above-referenced application.

Seismic data is customarily obtained by inducing seismic energy in the earth at a series of points 10, 12 and 14, for example, in a straight line. As the seismic energy propagates downwardly, a portion of the energy is reflected depending upon changes in the acoustical velocity characteristics of the successive strata. The reflected energy, or seismic response, is customarily detected by an array of geophones disposed at spaced intervals along the straight line. For example, an array of geophones 10a–10i might be used to record the seismic reflections from the seismic energy induced at shot point 10, array 12a–12i used to detect the reflections from shot point 12, and array 14a–14i to detect the seismic response from shot point 14. The seismic reflection data is then customarily corrected for step-out and corrected to a common datum plane 16 so that the response signal received by each geophone is the same as if the energy had been generated and received at each of the positions 10a–10i, 12a–12i, and 14a–14i. The geophones are separated by a horizontal distance $\Delta x$.

The velocity V at a depth z may be represented by the equation $$V_z = V_d + \frac{a_z t_z}{2} \quad (1)$$

wherein $V_d$ is the velocity at the datum line 16, $a_z$ is the acceleration of the seismic energy at depth z, and $t_z$ is the two-way travel time to depth z. The seismic energy travels as an arcuate wave-front which may be approximately defined as having an apparent center at a point H vertically below the datum point and a radius R where $$H = \frac{V_d}{a}\left(\cos h \frac{at}{2} - 1\right) \quad (2)$$

and $$R = \frac{V_d}{a}\left(\sin h \frac{at}{2}\right) \quad (3)$$

wherein $V_d$ is the velocity at the datum point, $a$ is the acceleration of the seismic energy and $t$ is the two-way travel time. These formulas assume a constant acceleration value $a$. In cases where this is not an adequate approximation, other definitions of the wave-front pattern may be used. In many cases, the depth H may be zero and the radius R varied in accordance with time depth data.

Figure 2:
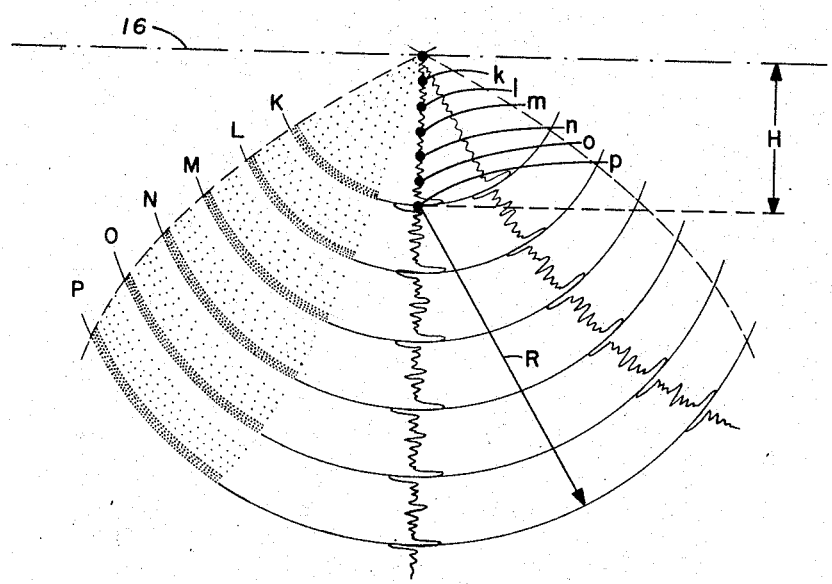
Figure 3:
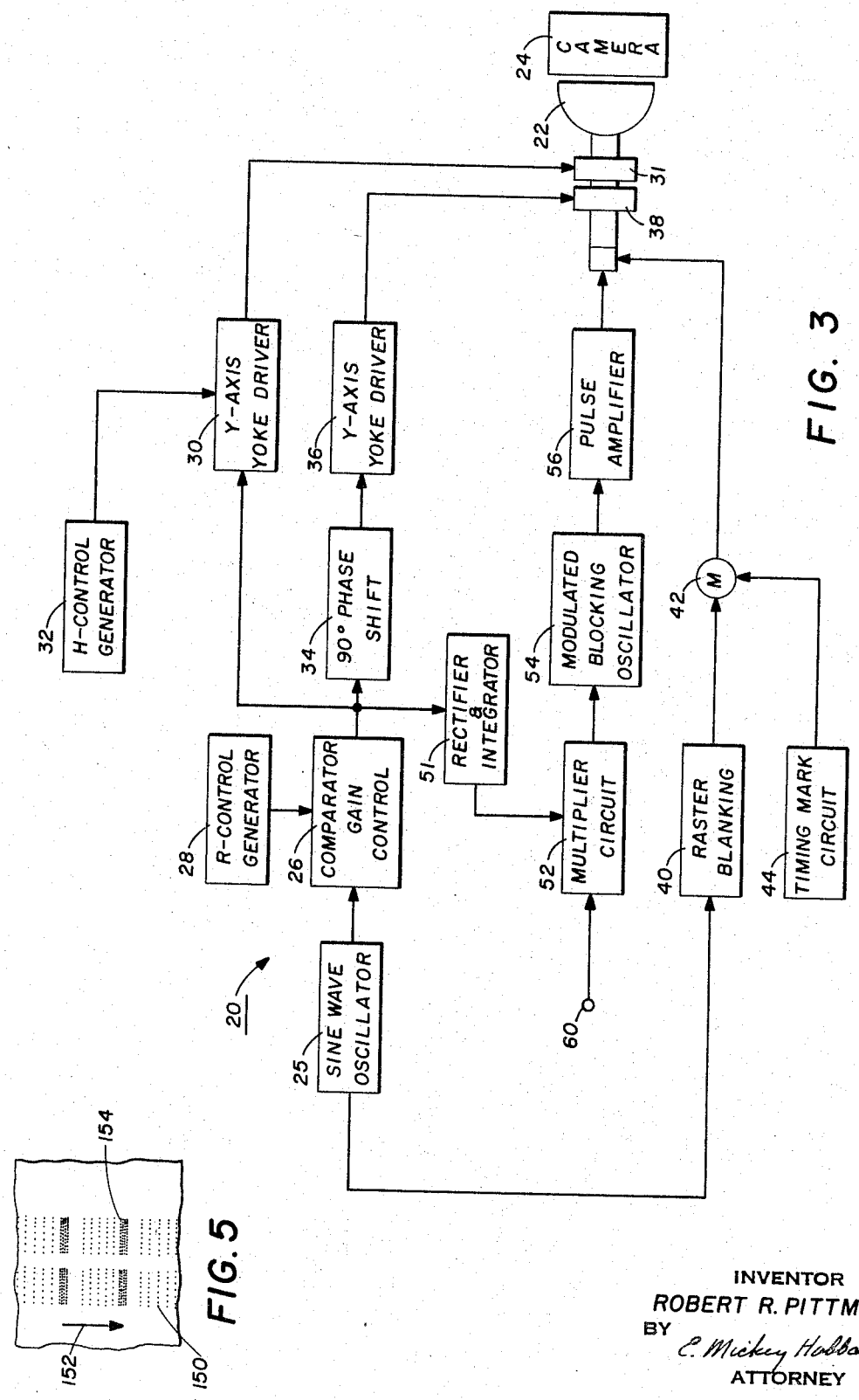
FIGURE 3 is a block diagram of a system constructed in accordance with the present invention.

In accordance with the present invention, each of the seismic response signals received at the points 10a–10i, for example, is plotted as a variable density wave-front pattern in its appropriate scalar position on a single record sheet. Each of the wave-front patterns is substantially as illustrated in FIGURE 2 wherein the instantaneous value at each point in time is plotted as a corresponding density arc having a radius R and an apparent center a distance H below the datum line. Thus for example, the seismic event K would be plotted as an arc having a center at $k$ and having a density proportional to the amplitude of the reflected energy. Similarly, a seismic event L would be plotted on an arc about the apparent center $l$, and seismic events M, N, O, and P would be plotted as arcs about the apparent centers $m$, $n$, $o$, and $p$, respectively. Of course, it will be understood that each time increment of the signal will be plotted in accordance with the intensity of the reflected signal recorded at the corresponding point in time in the same manner so as to have a continuous variable density pattern.

In accordance with the present invention, each of the variable density wave-front patterns is produced by a system indicated generally by the reference numeral 20. The principal component of the system 20 is a cathode ray tube 22. The tube 22 may be a high resolution 5 inch CRT for photo recording. Such tubes having a rated line width of 0.0008 inch and a resolution of 6,000 lines are commercially available. The tube may have magnetic deflection and a fine grain short persistence (P11) phosphor screen. A suitable camera 24 is positioned to record the image on the screen of the cathode ray tube 22.

The beam of the cathode ray tube 22 is scanned through a circle the radius of which progressively increases in accordance with Equation 3 and the center of which is progressively lowered in accordance with Equation 2. This is accomplished by a deflection circuit comprised of an oscillator generator 25 having a sine wave output which is fed to a comparator gain control 26. The sine wave generator 25 is the "raster" source for producing the wave-front and any conventional oscillator may be used for this purpose. No particular repetition rate or amplitude stability is required. An R-control generator circuit 28 provides a signal which varies at the same rate that the radius R varies, and is therefore dependent upon velocity data collected in the usual manner. The output from the R-control generator is applied to the comparator gain control circuit 26 which adjusts the amplitude of the sine wave from the oscillator 25 to a value corresponding to the signal from the R-control circuit. The output from the comparator 26 is applied to a Y-axis yoke driver circuit 30, the output of which is connected to the Y-axis magnetic deflection coils of the cathode ray tube 22. An H-control generator circuit 32 generates a signal proportional to the distance H of Equation 2 as determined by acceleration data. The signal from the H-control circuit is applied to the Y-axis yoke driver circuit 30 to D.C. bias the sine wave applied to the Y-axis deflection coils 31 and thereby cause the apparent center of the circular sweep of the beam to move downwardly. The output from the comparator gain control 26 is also passed through a 90° phase shift circuit 34 and is then fed to an X-axis yoke driver 36 which is connected to drive the X-axis deflection coils 38 of the cathode ray tube 22. Thus, the beam of the cathode ray tube 22 is swept through a circular path by the sine waves which are 90° out of phase and of equal amplitude. The radius of the circle is determined by the amplitude of the sine waves and therefore by the R-control generator, and the apparent center of the circle is determined by the D.C. bias from the H-control generator 32.

A raster blanking circuit 40 is connected to the oscillator 25 for timing purposes and generates a signal which is applied to a summation circuit 42 at half cycles of the sine wave so as to extinguish the beam of the tube for the 180° of each raster cycle so that only semicircles are written on the face of the tube 22. The output from a timing mark circuit 44 is also applied to modulate the beam through the summation circuit 42 to cause a circle of increased intensity to be written at predetermined time intervals, such as 0.1 second. The timing signal may be generated from an alternative source, or may be reproduced from the original seismic data, as desired.

A signal representative of the seismic data which is to be plotted as a variable density wave-front pattern is applied to input terminal 60 and thus to one input of a multiplier circuit 52. The multiplier circuit 52 multiplies the input seismic data signal and a D.C. signal which is derived from the sine wave signal from the comparator gain control by a rectifier and integrator circuit 51 to produce a product signal. The product signal from the multiplier circuit is applied to a modulated blocking oscillator circuit 54 which produces a series of pulses the repetition rate of which is proportional to the magnitude of the signal from the multiplier circuit 52. The pulses from the blocking oscillator circuit 54 are then applied to a pulse amplifier circuit 56 which converts each of the pulses from the blocking oscillator 54 to a pulse of uniform height and uniform duration. The pulses from the pulse amplifier 56 should be less than about 0.1 microsecond in duration. The output from the pulse amplifier 56 is applied to the cathode ray tube 22 to modulate the beam of the cathode ray tube 22 so that the beam will produce a series of very small dots of substantially uniform size and intensity, the density of the dots per unit area being representative of the amplitude of the signal being recorded, i.e., the seismic input data signal.

Figure 4:
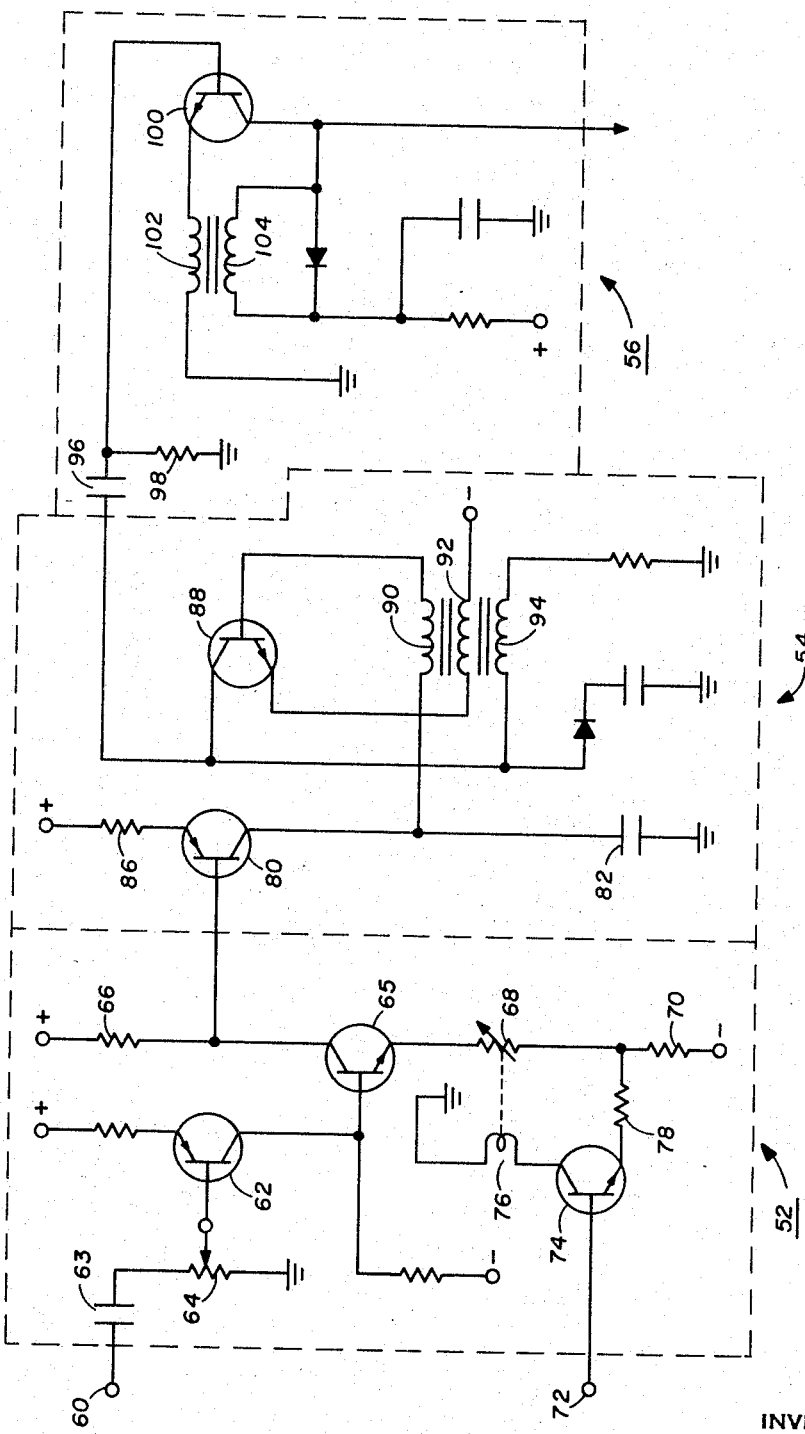
FIGURE 4 is a more detailed circuit diagram of a portion of the system of FIGURE 3.

In accordance with a more specific aspect of the invention, the circuit means for modulating the beam of the cathode ray tube 22 in accordance with the present invention is illustrated in detail in FIGURE 4. The seismic input signal is applied to input terminal 60 of the multiplier circuit 52. The input terminal 60 is capacitively coupled to the base of an amplifying transistor 62 by a capacitor 63 and a variable resistor 64. The output from the amplifier stage 62 is applied to the base of a second transistor 65. The collector of the transistor 65 is connected by a resistor 66 to a positive collector power supply, and the emitter is connected through a photoresistor 68 and fixed resistor 70 to a negative emitter power supply. The D.C. signal from the rectifier and integrator 51, which is representative of the amplitude of the sine wave from the comparator gain control 26, is applied to input terminal 72 and therefore to the base of transistor 74. The collector of transistor 74 is connected through the filament of a lamp 76 to ground which serves as a collector supply, and the emitter is connected through resistor 78 to the junction between the photoresistor 68 and resistor 70. The lamp 76 illuminates the photoresistor 68 the resistance of which decreases with increased illumination.

In the operation of the multiplier circuit 52, as the voltage applied to terminal 60 goes negative, the voltage applied to the base of transistor 65 also goes negative thereby increasing the impedance of transistor 65 and causing the voltage at the collector to go more positive. As the voltage applied to the terminal 72 from the comparator gain control 26 goes negative, the lamp 76 becomes less brilliant thereby increasing the resistance of the photoresistor 68. As the resistance of the photoresistor 68 increases, the output voltage at the collector of transistor 65 goes more positive. Thus, the voltage at the collector of transistor 65, which is the output of the multiplier circuit 52, tends to go positive in response to either of the inputs to terminals 60 and 72 going negative, and is representative of the product of the two signals because of the current through transistor 65, which is directly related to the voltage of the base, can be directly varied by varying the resistor in the emitter circuit. The emitter of transistor 74 is connected by the resistor 78 to the emitter circuit of transistor 65 between resistors 68 and 70 in order to provide feedback to the lamp circuit and thereby improve the linearity of the photoresistor 68.

The collector of transistor 65, which as mentioned is the output of the multiplier circuit 52, is connected to the base of a transistor 80. The emitter of transistor 80 is connected to an emitter power supply by a resistor 86, and the collector is connected through a capacitor 84 to ground. Therefore, the rate at which the capacitor 82 is charged is related to the voltage applied to the base of transistor 80, the charging rate increasing as the base voltage goes negative. The voltage charge across the capacitor 82 is applied to the base of an oscillator transistor 88 the base, emitter and collector circuits of which are inductively coupled for regenerative feedback by coils 90, 92 and 94, respectively. Thus, when the charge on the capacitor 82 exceeds a predetermined positive level, transistor 88 is very rapidly switched on by regenerative feedback. As the transistor 88 is turned on, the capacitor 82 is discharged through the base emitter circuit of transistor 88. When the system reaches saturation, the flux in the core of the inductively coupled coils collapses and the transistor is very rapidly switched off. Thus, as the voltage applied to the base of transistor 80 becomes more negative, the impedance of transistor 80 is reduced and the capacitor 82 is charged at a more rapid rate so that the firing voltage of the transistor 88 of the astable blocking oscillator circuit is reached in a shorter period of time. When the transistor 88 conducts, the capacitor 82 is discharged and the transistor 88 is again turned off until the capacitor 82 has again charged to a level sufficient to cause conductance of the transistor 88. Thus the output from the collector of the astable blocking oscillator transistor 88 is a square, negative going pulse of relatively short duration.

The pulses from the blocking oscillator 54 are applied to a differentiator comprised of the capacitor 96 and resistor 98 which produces positive and negative going spikes as a result of each square wave pulse from the blocking oscillator. These positive and negative spikes are applied to the base of transistor 100 of a regeneratively coupled pulse amplifier 56. The emitter and collector circuits of the transistor 100 are inductively coupled by coils 102 and 104 such that each positive going spike applied to the base of the transistor 100 rapidly turns the transistor 100 "on" due to the regenerative feedback until saturation is reached, at which time the flux in the core of the inductively coupled coils collapses and turns the transistor 100 off. This produces a square wave pulse of uniform height and uniform duration as a result of each positive spike from the blocking oscillator 54. The output from the pulse amplifier 56 is the collector of the transistor 100 which is connected to the cathode of the cathode ray tube 22 to modulate the beam of the tube and produce a corresponding series of pulses.

Thus it will be seen that the seismic input signal applied to terminal 60 is first amplified by the transistor 62, then multiplied by the D.C. signal derived from the sine wave output of comparator gain control circuit 26 by the circuit 51. The product signal from the collector of transistor 65 then controls the rate at which the capacitor 82 charges, and thereby controls the rate at which the transistor 88 of the blocking oscillator fires. The repetition rate of the pulses from the collector of the transistor 88 is therefore representative of the product of the seismic signal 60 and the amplitude of the sine wave signal which drives the X-axis and Y-axis yokes.

It is important to note that multiplication of the input data and the correction signal is required rather than mere addition. In the absence of a seismic signal or at quiescent state, it is necessary that the number of dots per unit of writing area remain constant with increasing beam speeds. This requires a uniform increase in the pulse rate. Further, when the seismic signal is applied, the quiescent dot density or pulse repetition rate must be changed or modulate on a percentage basis corresponding to the value of the seismic signal. These conditions are met by employing a multiplying circuit rather than a summation circuit to multiply the seismic signal and the correction factor of increasing beam speed. Since the speed of the beam is directly related to the radius R, and since the radius R is controlled by the amplitude of the sine wave, the amplitude of the sine wave may be used to provide a correction factor.

As the seismic response signal is applied to the multiplier circuit 52, the amplitude of the sine wave from the oscillator 24 is progressively increased by the comparator gain control circuit 26 in response to the R-control signal generated by the circuit 28 based upon available velocity data. As the amplitude of the sine wave is progressively increased, the beam of the cathode ray tube 22 is scanned through a progressively larger semicircular arc, one half of each raster cycle being blanked by the circuit 40. At the same time, the H-control generator 32 biases the Y-axis yoke driver so as to move the apparent center of the semicircular paths downwardly in accordance with acceleration data. At the same time, the seismic input data is multiplied by a signal representative of the amplitude of the sine wave from the comparator gain control circuit 26 and the product signal applied to the modulated blocking oscillator 54. The modulated blocking oscillator 54 produces a series of pulses at a repetition rate proportional to the product signal and these pulses are shaped to uniform height and duration by the pulse amplifier 56 and are applied to modulate the beam of the cathode ray tube 22.

Thus, as the beam of the tube 22 is scanned through the semicircular arcs, the instantaneous value of the seismic data is reproduced as a large number of very small dots of uniform size and intensity in appropriate position on the screen of the cathode ray tube 22 and are recorded on the film of the camera 24. The number of dots per unit area of the film is then directly related to the instantaneous value of the seismic response data to be presented in variable density form. Successive incremental values of the seismic data are presented as successive arcuate bands of appropriate dot density which have apparent centers and radii as designated by Equations 2 and 3 above and will have an appearance substantially as illustrated in the left hand portion of FIGURE 2. After each seismic response signal has been recorded, the film of the camera 24 is indexed a scalar distance $\Delta x$ and the next successive seismic trace may be converted to a wave-front pattern in the same manner. After the wave-front patterns for all of the adjacent shot points, for example shot points represented at 10a–10i, have been produced, the image recorded by the film of the camera 24 will be a series of generally horizontally disposed reinforcement patterns lying tangent to the arcuate patterns produced by arcs of corresponding density, and these patterns will be representative of the true location of the reflecting interfaces.

Since all of the dots produced on the face of the CRT tube 22 are of substantially the same size and intensity, the transfer characteristics of the CRT tube become relatively unimportant and intensity adjustments of the beam are not critical. Similarly, the film transfer characteristics become relatively unimportant since only zero or total exposure and development is required. Further, signal integration becomes a straightforward matter of merely summing dots per unit of area.

The embodiment of the invention described above is illustrative of recording a variable signal over two dimensions and thereby provides a three-dimensional recording system. Although in the particular system illustrated it is desired to scan the beam generally through arcuate paths, it will be appreciated that any desired scanning path may be utilized in order to accomplish the desired three-dimensional record. The basic principles and method of this invention may also be used in substantially all of the embodiments defined in the above-referenced application. It will also be appreciated that a similar system may be utilized to record a variable signal with respect to a single ordinate axis as illustrated in FIGURE 5. In such a system, the beam may be scanned at a high rate through a short stroke from side to side to provide a line 150 having a width, while slowly being scanned in the longitudinal direction represented by the arrow 152 to simulate the time or other variable represented by the ordinate axis. Adjacent seismic response traces may be recorded as second and subsequent lines 154, etc., to provide complete strata representation in the conventional manner. Further, the system lends itself particularly to the compositing of seismic data. In the embodiment illustrated, the seismic data is composited in migrated position. However, the seismic data can also be composited by successively recording a number of seismic response signals over the same line area having a single ordinate axis.

From the above description it will also be evident that a novel process for providing a variable density presentation of data has been described. In general, the process comprises modulating the repetition rate of a constant amplitude signal used to write on a recording medium in accordance with the data to be recorded while scanning energy carrying the signal over a recording medium sensitive to the energy. In accordance with another aspect of the invention, the repetition rate of the beam of energy is further modulated in accordance with the speed at which the beam is scanned over the recording medium so as to maintain a direct relationship between the number of dots recorded per unit area and the magnitude of the data being recorded even though the speed of the beam over the record sheet may vary.

Although preferred embodiments of the invention have been described in detail, it is to be understood that various changes, substitutions and alterations can be made therein without departing from the spirit and scope of the invention as defined by the appended claims. For example, the process and apparatus of the invention may be used to record data other than seismic data, such as sonar data.

What is claimed is:

1. The system for recording seismic response data as a variable density wave-front pattern which comprises:
   means for scanning a beam of energy over a record sheet sensitive to the energy in a series of arcs the radii of which increase in a manner determined by velocity data and the apparent centers of which are lowered in accordance with acceleration data,
   means for modulating the beam of energy to produce a series of pulses of substantially uniform size having a repetition rate representative of the product of the instantaneous value of the seismic response data and the velocity of the beam of energy over the record sheet to produce a wave front pattern, and
   means for indexing the record sheet past the means for scanning the beam of energy at intervals less than the scanning width of the beam after each scanning cycle produces a wave front pattern whereby successive wave front patterns will overlap and be partially superimposed one upon the other.

2. The system for recording seismic response data as a variable density wave-front pattern which comprises:
   a cathode ray tube having a luminescent screen, means for generating an electron beam directed at the screen, and X-yoke means and Y-yoke means for deflecting the beam in X and Y coordinates,
   an oscillator circuit for producing a sine wave,
   a comparator gain control coupled to the oscillator for varying the amplitude of the sine wave in accordance with velocity data,
   first driver means coupled to the comparator gain control and to the Y-axis yoke for driving the Y-axis yoke of the cathode ray tube,
   phase shifting means coupled to the comparator gain control for producing a second sine wave ninety degrees (90°) out-of-phase with the sine wave from the comparator gain control,
   second driver means coupled to the phase shifting means and to the X-axis yoke for driving the X-axis yoke of the cathode ray tube,
   a rectifier circuit coupled to the comparator gain control for producing a D.C. signal representative of the amplitude of the sine wave signal,
   a multiplier circuit for receiving a seismic response signal and coupled to the rectifier circuit for receiving the D.C. signal and producing a signal representative of the product of the two signals,
   a modulated blocking oscillator circuit coupled to the multiplier circuit for producing a series of pulses at a repetition rate representative of the product signal, and
   a pulse amplifier circuit coupled to the blocking oscillator circuit for producing a series of pulses of substantially uniform size at a repetition rate representative of the repetition rate of the pulses from the blocking oscillator, the output of the pulse amplifier circuit being coupled to the tube for modulating the beam.

3. The system defined in claim 2 wherein:
   the multiplier circuit is comprised of an amplifier stage for receiving one of the signals,
   a variable resistor in the emitter circuit of the amplifier stage, and
   means for varying the resistance of the variable resistor in accordance with the other signal, the collector of the amplifier stage being the output for the multiplier circuit.

4. The system defined in claim 2 wherein:
the multiplier circuit is comprised of a transistor the collector of which is connected through a resistor to a collector power supply, the base of which is connected to receive one of the signals, and the emitter of which is connected through a photon variable resistor to an emitter power supply, and an input circuit means for receiving the other signal including a lamp for illuminating the variable resistor with an intensity representative of the input signal, the modulated blocking oscillator is comprised of a second transistor the base of which is connected to the collector of the transistor of the multiplier circuit, the emitter of which is connected to an emitter power supply, and the collector of which is connected through a capacitor to a collector power supply whereby the capacitor will be charged at a rate proportional to the signal applied to the base of the second transistor, and a blocking oscillator transistor the base of which is connected to the collector of the second transistor and the base emitter and collector circuits of which are inductively coupled for regenerative feedback, whereby the blocking oscillator transistor will fire each time the voltage charge exceeds a predetermined level, and the pulse amplifier circuit comprises a differentiator circuit connected to the collector of the blocking oscillator transistor for producing a positive and negative spike in response to each firing of the blocking oscillator, and a third transistor the base of which is connected to the differentiator circuit and the collector and emitter circuits of which are inductively coupled for regenerative feedback and blocking action, the collector of the third transistor being the output of the pulse amplifier circuit.

5. The system for producing a series of uniformly sized pulses having a repetition rate representative of the product of two input signals which comprise:
a multiplier circuit for multiplying the two input signals and producing an output product signal,
a modulated blocking oscillator circuit coupled to the multiplier circuit for producing a series of pulses at a repetition rate representative of the product signal, and
a pulse amplifier circuit coupled to the blocking oscillator circuit for producing a series of pulses of uniform amplitude and duration at a repetition rate corresponding to the repetition rate of the pulses from the blocking oscillator circuit.

6. The system for producing a series of uniformly sized pulses having a repetition rate representative of the product of two input signals which comprises:
a multiplier circuit comprising a transistor the collector of which is connected through a resistor to a collector power supply, the base of which is connected to receive one of the signals, and the emitter of which is connected through a photon variable resistor to an emitter power supply, and an input circuit means for receiving the other signal including a lamp for illuminating the variable resistor with an intensity representative of the input signal, a modulated blocking oscillator circuit comprised of a second transistor the base of which is connected to the collector of the transistor of the multiplier circuit, the emitter of which is connected to an emitter power supply, and the collector of which is connected through a capacitor to a collector power supply whereby the capacitor will be charged at a rate proportional to the signal applied to the base of the second transistor, and a blocking oscillator transistor the base of which is connected to the collector of the second transistor and the base emitter and collector circuits of which are inductively coupled for regenerative feedback, whereby the blocking oscillator transistor will fire each time the voltage charge exceeds a predetermined level, and a pulse amplifier circuit comprising a differentiator circuit connected to the collector of the blocking oscillator transistor for producing a positive and negative spike in response to each firing of the blocking oscillator, and a third transistor the base of which is connected to the differentiator circuit and the collector and emitter circuits of which are inductively coupled for regenerative feedback and blocking action, the collector of the third transistor being the output of the pulse amplifier circuit.

7. A multiplier circuit for multiplying two signals comprising:
a transistor the collector of which of connected through a resistor to a collector supply voltage, the base of which is connected to receive one of the input signals as a voltage, and the emitter of which is connected through a variable resistor to an emitter voltage supply, and
means for varying the resistance of the variable resistance in accordance with the other signal, the collector of the transistor being the output for the multiplier circuit.

8. The multiplier circuit defined in claim 7 wherein:
the variable resistor is a photoresistor and the resistance of the photoresistor is varied by a lamp illuminated by the other input signal.

9. The multiplier circuit defined in claim 7 wherein:
the variable resistor is a photoresistor and a fixed resistor connected in series, the photoresistor being connected to the emitter of the transistor, and
the means for varying the resistance comprises a lamp filament connected in the collector circuit of a second transistor the base of which is connected to receive the second signal as a voltage and the emitter of which is connected to the junction between the photoresistor and the fixed resistor for feedback, the lamp being positioned to illuminate the photoresistor.

References Cited by the Examiner

UNITED STATES PATENTS

| | | | |
|---|---|---|---|
| Re. 25,928 | 12/1965 | Geyer et al. | 346—33 X |
| 2,703,150 | 3/1955 | Rieber | 346—33 X |
| 3,025,123 | 3/1962 | Klein | 346—110 |
| 3,063,053 | 11/1962 | Blake et al. | 346—33 X |
| 3,076,193 | 1/1963 | Applebaum | 332—21 |
| 3,151,955 | 10/1964 | Graybeal | 332—21 |

RICHARD B. WILKINSON, *Primary Examiner.*

J. M. MURRAY, J. W. HARTARY, *Assistant Examiners.*